A. RACE.
Transplanters.
No. 147,977.
Patented Feb. 24, 1874.
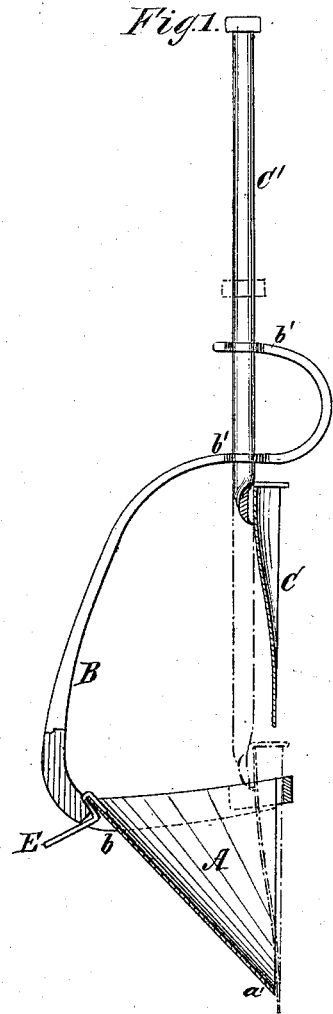
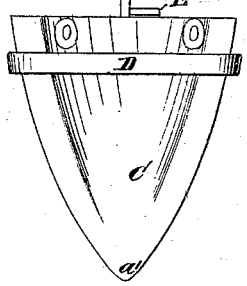
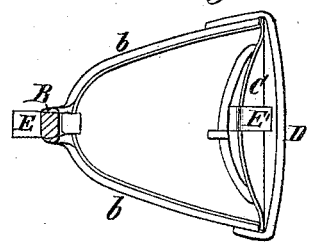
Witnesses:
Inventor:
Ara Race
Per
Attorneys.

UNITED STATES PATENT OFFICE.

ARA RACE, OF CHERAW, SOUTH CAROLINA.

IMPROVEMENT IN TRANSPLANTERS.

Specification forming part of Letters Patent No. 147,977, dated February 24, 1874; application filed September 3, 1873.

*To all whom it may concern:*

Be it known that I, ARA RACE, of Cheraw, in the county of Chesterfield, State of South Carolina, have invented a new and Improved Transplanter; and I do hereby declare that the following is a full, clear, and exact description of the same, reference being had to the accompanying drawing, forming a part of this specification, in which—

Figure 1 is a side elevation partly broken out. Fig. 2 is a horizontal section. Fig. 3 is a front view.

The invention relates, generally, to transplanters, but particularly to those which are used for the removal and transplantation of cotton-plants.

It will first be fully described, and then clearly pointed out in the claims.

A represents a plate bent to form a deep concavity, as well as a pointed end, $a'$, and provided with a curved rod, B, having two arms, $b\ b$, that embrace the upper part of said plate. C is a spade, convexed on the inner side, sliding through guide-grooves formed between an iron strap, D, and the plate A, and having a handle, $C'$, that works in slots $b'\ b'$ of rod B. E E$'$ are two foot-rests, by which the transplanter is forced into the ground.

The operation is as follows: The spade is drawn up, and the concaved plate A forced obliquely into the ground between two plants, the one intended to stand being left on the convex side, and the one to be removed being brought within the concavity of the plate. The spade C is then forced down, thus removing one plant with a surrounding portion of soil packed against it by the action of the convex side of spade. The transplanter is then carried forward to a bald place, where the seed has failed or perished, and forced into the ground. The spade is then raised, and, subsequently, the concaved plate, leaving the transferred plant in its new bed.

Having thus described my invention, what I claim as new, and desire to secure by Letters Patent, is, viz:

1. The curved spade C, with a convexity on the inner side, and arranged opposite the concavity of plate A, as and for the purpose described.

2. The crooked slotted guide-rod B and the spade-handle C, combined, and applied in connection with the spades A and C of a transplanter, as and for the purpose specified.

ARA RACE.

Witnesses:
PETER SOMMER,
JOHN STUART.